United States Patent [19]
van Velthoven et al.

[11] Patent Number: 5,321,676
[45] Date of Patent: Jun. 14, 1994

[54] RECORD CARRIER SCANNING APPARATUS WHEREIN THE SCANNING HEAD IS POSITIONED WITHOUT FEEDBACK AND A PREDETERMINED RANGE OF FINE POSITIONING OF THE SCANNING POINT IS MAINTAINED

[75] Inventors: Johannes L. van Velthoven, Middelburg; Antonius H. M. Akkermans; Theodorus A. Koopmanschap, both of Eindhoven, all of Netherlands

[73] Assignee: U.S. Philips Corporation, New York, N.Y.

[21] Appl. No.: 952,379

[22] Filed: Sep. 28, 1992

[30] Foreign Application Priority Data

Dec. 10, 1991 [EP] European Pat. Off. ........ 91203219.0

[51] Int. Cl.$^5$ .......................... G11B 17/22; G11B 7/00
[52] U.S. Cl. .................................. 369/32; 369/44.28; 360/78.06
[58] Field of Search .................... 369/32, 44.28, 44.11, 369/44.34, 44.31, 44.32, 44.29, 44.27, 44.26, 58, 124, 240; 360/78.04, 78.05, 78.06, 78.08, 78.12, 78.14, 72.02, 77.02

[56] References Cited

U.S. PATENT DOCUMENTS 4,899,325  2/1990  Katsuhara et al. .................... 369/32

FOREIGN PATENT DOCUMENTS 1429882  3/1976  United Kingdom .

Primary Examiner—Robert J. Pascal
Assistant Examiner—Ali Neyzari
Attorney, Agent, or Firm—Leroy Eason

[57] ABSTRACT

Scanning apparatus for a disc-shaped record carrier having a spiral track, the apparatus including a scanning head arranged on a slide which is radially displaceable with respect to the record carrier. The scanning point produced by the scanning head is maintained on the track by a tracking control system which includes a fine positioning device secured to the slide and which radially displaces the scanning point within a predetermined limited range of displacement determined by the positioning of the fine-positioning device with respect to the slide. A position-indication signal (PS) indicative of such position is generated, and a control unit detects when such signal exceeds a predetermined limit value. In that event, the control unit energizes a driving motor of the radial displacement device by supplying an energizing pulse pattern thereto which causes displacement of the slide to a position at which the position-indication signal returns to a value below the limit value. The energizing pulse pattern is adjusted by the control unit so that the displacement of the fine-positioning device in response thereto remains within predetermined limits and/or is symmetrical about a central position of such device relative to the slide.

5 Claims, 5 Drawing Sheets

RECORD CARRIER SCANNING APPARATUS WHEREIN THE SCANNING HEAD IS POSITIONED WITHOUT FEEDBACK AND A PREDETERMINED RANGE OF FINE POSITIONING OF THE SCANNING POINT IS MAINTAINED

BACKGROUND OF THE INVENTION

1. Field of the Invention

The invention relates to apparatus for scanning a disc-shaped record carrier having a track in the form of a spiral which substantially surrounds a point of rotation of the record carrier, said apparatus comprising a record carrier driving device for causing the record carrier to rotate about the point of rotation; a scanning head producing a scanning point on the track; a scanning head support, for example, a slide which is radially displaceable with respect to the record carrier; drive means for radially displacing the scanning head support; and a control system for maintaining the scanning point on the track. Such control system comprises a fine-positioning device arranged on the scanning head support for radially displacing the scanning point across the record carrier within a predetermined limited range of displacement by varying the position of the fine-positioning device with respect to the scanning head support, means for supplying a position-indication signal which is indicative of the position of the fine-positioning device, means for detecting when the position-indication signal exceeds a predetermined threshold value, and control means for temporarily energizing the scanning head support driving device when the threshold value is exceeded so as to displace the scanning head support towards a position at which the position-indication signal resumes a value below the threshold value.

2. Description of the Related Art

Such apparatus is known from GB-B-1,429,882. This document describes a reading device for optical record carriers. In this reading device an optical scanning head is used which produces a focused light beam directed onto the record carrier, a scanning spot being formed on the record carrier at the location of the scanning point. The scanning spot can be radially displaced within a limited range across the record carrier by means of a fine-positioning device in the form of a pivotable mirror. The scanning head includes the pivotable mirror and is mounted on a slide which can be radially displaced by means of the driving device. The driving device comprises a motor-driven spindle which engages a rack provided on the slide.

The radial position of the slide is continuously corrected in dependence upon the position-indication signal so as to maintain the pivotable mirror substantially proximate to the centre of its range of displacement. Furthermore, said document states that it is possible to activate the driving device for the slide only when the excursion of the pivotable mirror has exceeded an extreme position thereof.

In such known apparatus control of the slide position is by a feedback loop. This feedback creates problems when the variable transmission ratio of the spindle/rack combination comprised by the driving device is increased in order to increase the access speed when searching for the position of particular information on the record carrier. Due to hysteresis of the driving system, the displacement of the scanning head will often exhibit an unwanted oscillatory character at large transmission ratios. These oscillations have a detrimental influence on the fine-positioning of the scanning point. Moreover, they result in a higher energy consumption and may also produce an audible production of sound and extra wear.

SUMMARY OF THE INVENTION

An object of the invention is to provide apparatus as described in the opening paragraph in which the above-mentioned drawbacks are obviated.

According to the invention, this object is achieved by providing control means which energize the scanning head support driving device in conformity with an energization pattern which is independent of the instantaneous value of the position-indication signal. Consequently, there is no feedback of the instantaneous value of the position-indication signal to control the driving device for the scanning head support, and so oscillations in the positioning of the scanning head are avoided.

In principle, it is possible to set the control means only once, for example, during or immediately after assembly of the apparatus, and to leave this setting always unmodified. However, since the circumstances in which the driving device is to operate may vary considerably during use a fixed control setting is not always best adapted to these circumstances.

An embodiment of the invention which obviates this drawback is characterized in that the control means comprise detection means for detecting the influence of the energization pattern on the position-indication signal and setting means for adapting, after the energization, the setting of the control means in dependence upon the detected influence.

A further embodiment is characterized in that the control means are adapted to determine the influence of the energization in a predetermined time interval after terminating the energization. By postponing the determination of the influence of the energization, it is achieved that the scanning head support has already come to a standstill at the instant of determination so that high accuracy of determining the influence is obtained.

As a result of an eccentric location of the center of rotation, the position of the fine-positioning device will not change monotonically but will reciprocate around a slowly varying average position. In the case of a large eccentricity it may occur that, due to the eccentricity, there is a movement of the fine positioning device towards the end of its displacement range after the driving device has been energized. An embodiment of the device which obviates this drawback is characterized in that the control means for determining the influence of the energization of the driving device on the positioning of the fine-positioning device comprise means for detecting whether a second threshold value having a sign which is opposite to the above-mentioned first threshold value is exceeded by an absolute value which is larger than that of the first threshold value, the control means being adapted to then energize the scanning head support driving device in conformity with a second energization pattern so as to displace the scanning head in a direction opposite to the displacement caused by the above-mentioned first energization pattern.

The invention is eminently suitable for use in combination with scanning head driving devices of the self-braking type, such as, for example driving devices using a spindle-rack combination. In that case the scanning head is kept in position between successive energization operations and without the supply of energy to the driving device from the exterior, so that the positioning of the scanning head support is substantially insensitive to exterior shock-like disturbances. Of course, the invention is not limited to use of self-braking driving devices. Other driving devices, for example a linear motor, are alternatively possible. In the latter case it is recommended to actively brake the linear motor between successive energization operations.

BRIEF DESCRIPTION OF THE DRAWINGS

The invention will hereinafter be described in greater detail with reference to FIGS. 1 to 7 in which.

DESCRIPTION OF THE PREFERRED EMBODIMENTS

Figure 1:
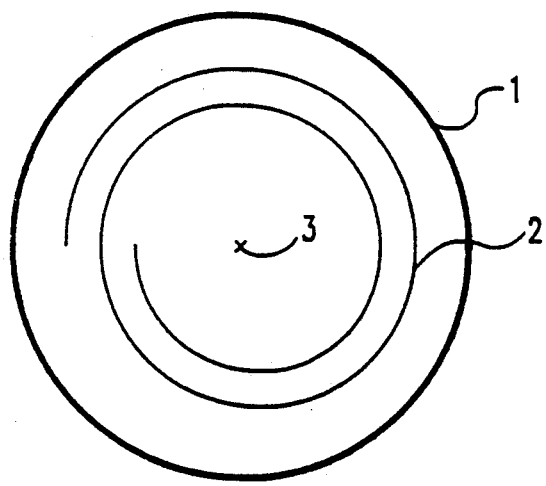
FIG. 1 is a plan view of a disc-shaped record carrier having a spiral track.

The disc-shaped record carrier 1 in FIG. 1 is of a conventional type, for example a magnetic or optical record carrier. It has a spiral track 2 which surrounds a center of rotation 3. During rotation the track 2 is scanned by apparatus as in FIG. 2.

Figure 2:
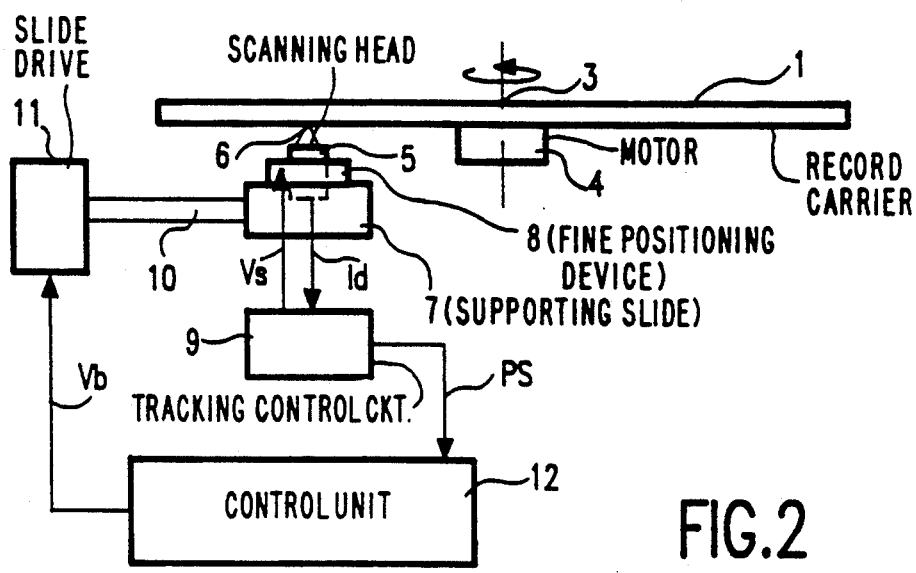
FIG. 2 shows an embodiment of a scanning apparatus according to the invention.

The apparatus in FIG. 2 comprises a driving device in the form of a motor 4 for causing the record carrier 1 to rotate about the center of rotation 3. A scanning head 5 of a conventional type, for example an optical or magnetic read and/or write head, is arranged opposite the rotating record carrier 1. The scanning head scans the record carrier 1 with a radiation spot at the location of a scanning point 6. The scanning head 5 is secured to a scanning head support, for example in the form of a slide 7, which is radially displaceable with respect to the record carrier. The scanning point can be radially displaced with respect to the slide 7 by means of a fine-positioning device 8 of a conventional type. The scanning point 6 is kept directed on the track by means of a control system of a conventional type. In the embodiment shown the control system comprises the fine-positioning device 8 and a control circuit 9. The control circuit 9 derives a tracking error signal from detection signals Id supplied by the scanning head 5 and derives a tracking control signal Vs for the fine-positioning device 8 from the tracking error signal, such that the tracking error signal is maintained substantially equal to zero. The scanning device further comprises a driving device for radially displacing the slide 7. The slide driving device is preferably of the self-braking type, i.e. it is not necessary to supply energy from the exterior to retain the slide in position in its non-energized state. Driving devices of the self-braking type have the advantage that they are not very sensitive to shock-like disturbances from the exterior, and also they need no energy when they are in a non-energized state. However, it is to be noted that the driving device may alternatively be of a type different from the self-braking type. For example, a driving device comprising a linear motor may also be used. To render such a driving device insensitive to shock-like disturbances, it is recommended to provide it with an active brake. In the embodiment shown the driving device consists of a lead screw nut which secures the slide to a spindle 10 driven by a drive motor 11.

In the scanning apparatus of FIG. 2 a position-indication signal PS is generated by control circuit 9, which signal is indicative of the position of the fine-positioning device 8 with respect to the supporting slide 7. If the position of the fine-positioning device is substantially proportional to the received tracking control signal Vs, and the control circuit 9 includes an integrator for realizing an integrating control action, the output signal of this integrator may serve as the position-indication signal PS. However, it is alternatively possible to use a separate position detector for obtaining the position-indication signal PS. The use of the output signal of an integrator of the control circuit is, however, preferred because no extra components are then required.

Figure 3:
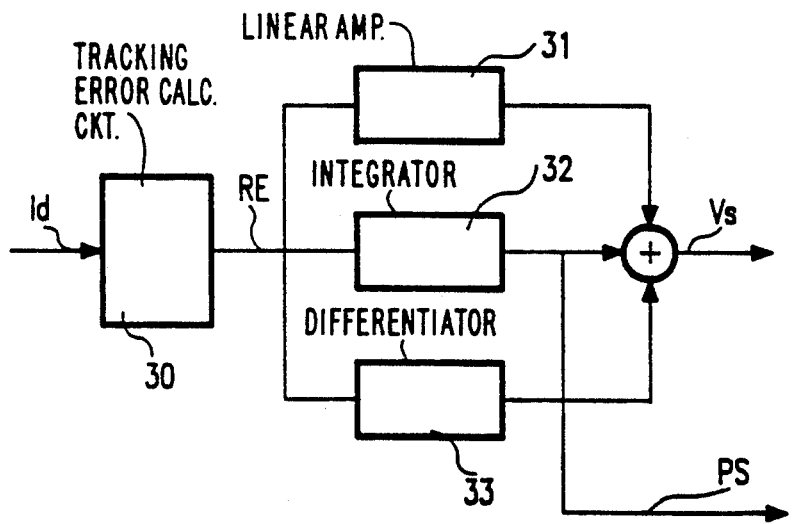
FIG. 3 shows an embodiment of a control circuit for use in the scanning apparatus.

For the purpose of illustration FIG. 3 shows a control circuit of a conventional type by which the position-indication signal PS can be derived. The circuit 30 is of a conventional type for calculating a tracking error signal RE from the detection signals Id supplied by the scanning head. The tracking error signal is applied to a linear amplifier 31 for obtaining a proportional tracking control action, an integrator 32 for obtaining an integrating tracking control action and a differentiator 33 for obtaining a differentiating tracking control action. The output signals of the linear amplifier 31, the integrator 32 and the differentiator 33 are combined in an adder circuit to produce a control signal Vs for the fine-positioning device 8. The position-indication signal PS can be derived from the output of the integrator 32.

The apparatus shown in FIG. 2 further comprises a control unit 12 which, on the basis of the position-indication signal PS, derives an energization signal Vb for the driving motor 11 for displacing the slide 7. The derivation of the energization signal Vb on the basis of the position-indication signal PS will be elucidated with reference to FIG. 4. Therein the position-indication signal PS is shown as a function of time t. At instant t0 it has a value PS1 which is slightly lower than the value M corresponding to the central position of the fine-positioning device. The energization signal Vb for driving motor 11 is equal to zero, which means that the position of the slide remains unchanged. While the track is being scanned, the scanning point is held on the track 2. Due to the fact that the track 2 is spiral shaped, the position of the fine-positioning device will slowly change. At instant t1 the fine-positioning device reaches its central position. At instant t2 the signal PS reaches a threshold value LV1. Exceeding of this value is detected by the control unit 12. In response to this detection the control unit 12 supplies an energizing pulse to drive motor 11 having a given energization pattern. Due to this energization pattern, the slide 7 will be displaced over a given distance by the motor 11. This energization pattern may have various forms. However, the pattern preferably comprises an acceleration pulse 40 and a braking pulse 41 of such a strength that the slide comes to a complete or substantially complete standstill at the end of the braking pulse (at instant t3). While the slide 7 is being displaced, the tracking control circuit 9 keeps the scanning point 6 on the track, so that the fine-positioning device 8 is brought to a different position which is located at the other side of its central position. After displacement of the slide, the position of the fine-positioning device 8 will gradually change again until at instant t4 the position is reached at which the associated position-indication signal reaches the threshold value LV1 again and an energizing pulse is again supplied by the control unit. In the manner described, the slide is thus displaced by way of a pulsatory energization whenever a position corresponding to the threshold value is reached. The advantage thereof is that the energy required for displacing the slide 7 is minimal. Moreover, the slide is at a standstill between successive energizing pulses and so there is little disturbance of the control of the fine-positioning device 8 due to the position control. This is in contrast to a control in which the position of the slide is continuously corrected on the basis of the instantaneous position of the fine-positioning device. Particularly at high transmission ratios of the driving device of the slide, such a control involves the risk that the slide positioning will exhibit an oscillatory behaviour.

The circumstances in which re-positioning of the slide must be performed may considerably vary with time, so that the distance covered by the slide 7 as a result of the energizing pulse may vary. For example, the geographical location of the scanning apparatus is of great influence on this distance. In fact, dependent on this location, gravitational force will promote or inhibit the displacement to a smaller or larger extent.

It is therefore preferred to adapt the setting of the control unit 12 for generating the energizing pulses, dependent on the influence of the energizing pulse on the displacement of the slide 7.

For example, it is desirable that the working range of the fine-positioning device 8 be substantially symmetrical with respect to its central position. This can be achieved by adapting the threshold value LV1 at which, for a constant pattern of the energizing pulse, a pulse is to be supplied. This may be realised, for example, by determining the signal value of the position-indication signal PS after the energizing pulse has been supplied and comparing the absolute value of this signal value with the threshold value LV1. If the given absolute value is smaller than LV1, the value of LV1 is decreased and if the absolute value is larger than the value LV1, the value of LV1 is increased. This method may be achieved by increasing the energy of the energizing pulse each time in steps until the variation of the signal value of PS caused by the energizing pulse has reached a given minimum value, and by subsequently adapting the threshold value LV1 until the working range of the fine-positioning device 8 is located symmetrically around its central position. Another interesting method of adapting the setting of the control unit 12 is to adapt the energy of the energizing pulse in such a way that the displacement of fine-positioning device 8 caused by the energizing pulse remains within predetermined limits.

Figure 5:
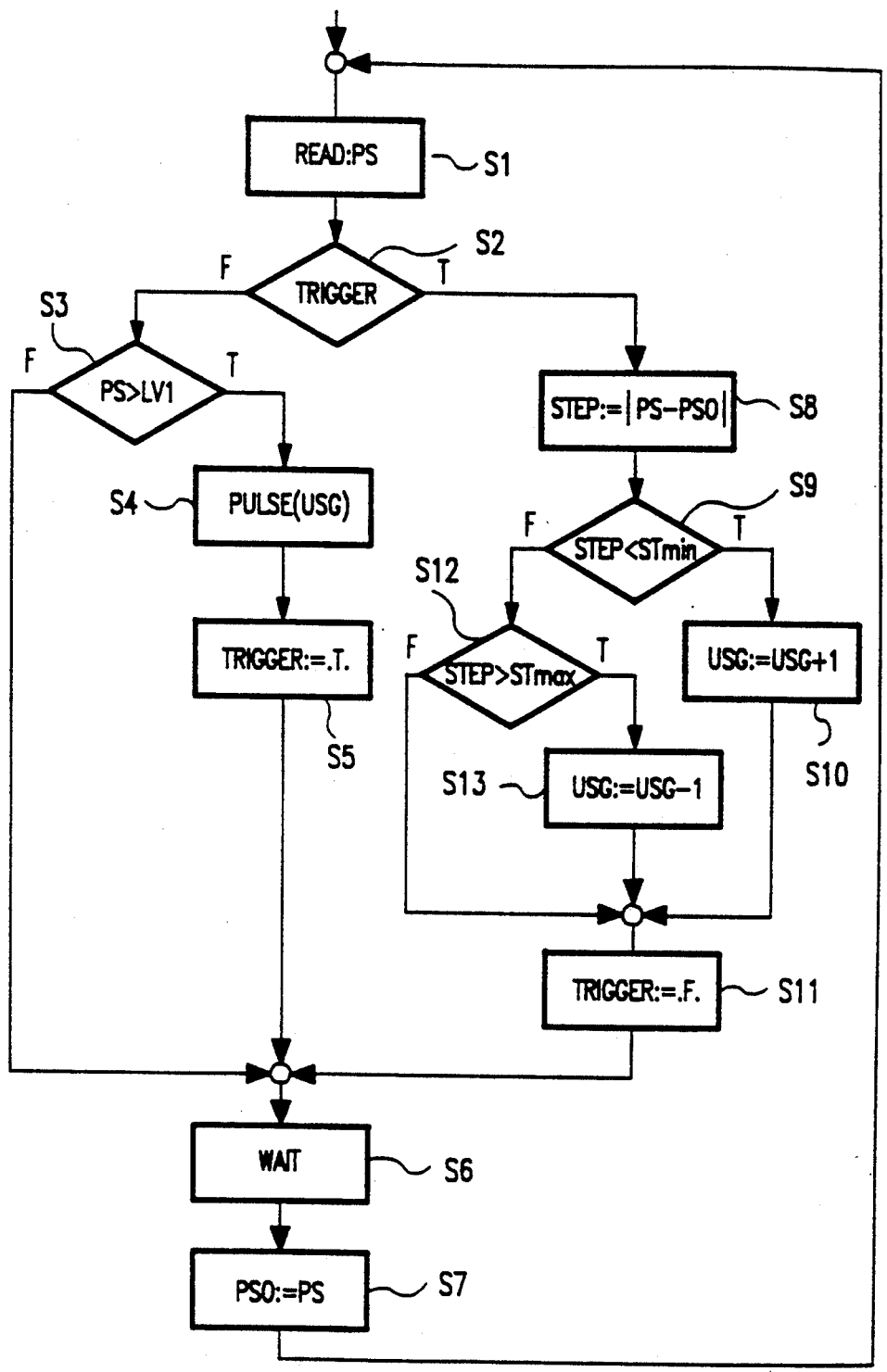

The control unit 12 may be implemented as a "hard-wired" circuit or as a program-controlled processor which is loaded with a suitable control program. FIG. 5 shows a flow chart of a program which, by way of example, is suitable for adapting the energy of the energizing pulse so as to keep the displacement of slide 7 caused by the energizing pulse within predetermined limits. This program comprises a step S1 in which the value of the position-indication signal is read. This step is followed by a step S2 in which a logic variable TRIGGER indicates by means of the value .T. that an energizing pulse has just been supplied and a value .F. that no energizing pulse has been supplied. If the value of the variable TRIGGER is .F., step S3 is performed. In this step it is checked whether the value of PS which has been read is below or above the threshold value LV1. If the read value is above the threshold LV1, step S3 is followed by step S4 in which a program function PULSE(USG) calls for supplying the energizing pulse with an energy content fixed by USG. This function will hereinafter be described in greater detail. After step S4 the logic value .T. is assigned to the variable TRIGGER when performing step S5. Subsequently, a waiting step S6 is performed in which a waiting time is observed for the further execution of the program until a predetermined time T has elapsed.

If it has appeared in the execution of step S3 that the value PS which has been read is below the threshold value LV1, step S3 is immediately followed by step S6. After step S6, step S7 is carried out in which an auxiliary variable PSO is rendered equal to the last value of PS which has been read. Subsequently the program is continued again with the reading step S1.

When it is subsequently apparent during execution of step S2 that the variable TRIGGER has the logic value .T., and consequently an energizing pulse has just been supplied, step S8 is carried out. In this step the value of the displacement of the fine-positioning device caused by the energizing pulse is determined by determining the absolute value STEP of the difference between the last read value of PS and the value PSO of the last-but-one read value of PS. In step S9 it is subsequently determined by comparing the value of STEP with a threshold value STMIN whether the realised displacement is smaller than a minimum distance. If so, the value of the variable of the energy contents of the energizing pulses is increased during the execution of step S10. Subsequently step S11 is carried out in which the variable TRIGGER acquires the logic value .F..

If it has appeared during the execution of step S9 that the variable STEP is larger than STMIN, it is checked during the execution of step S12 whether the STEP is larger than the threshold value STMAX. If so, the variable USG fixing the energy contents of the energizing pulse is decreased in step S13. Subsequently step S11 is carried out. If it has appeared during the execution of step S12 that the value of STEP is below the threshold value STMAX, step S12 is directly followed by step S11. After the execution of step S11 the program is continued with the waiting step S6.

Figure 7:
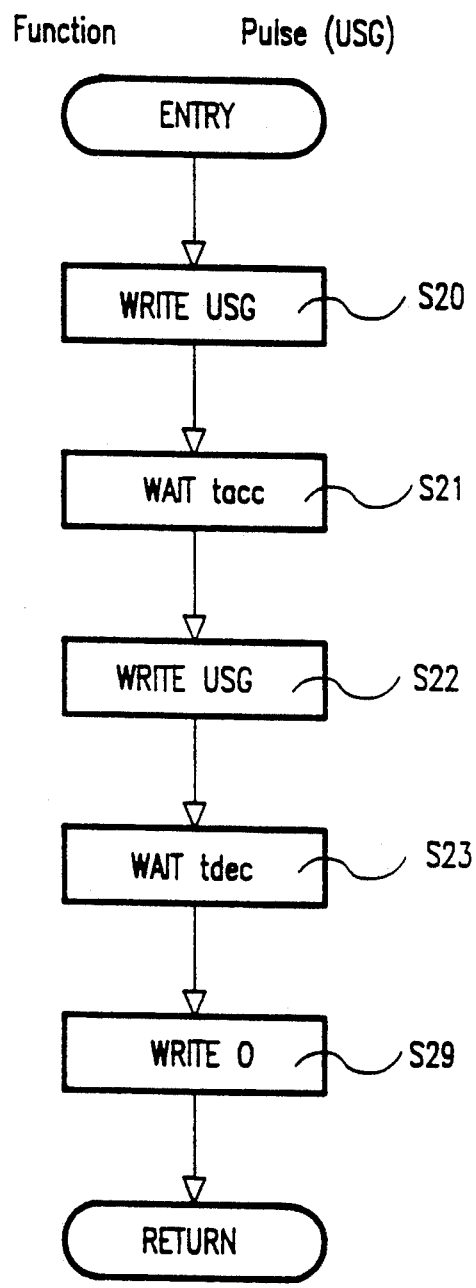

FIG. 7 shows a flow chart of an example of the program function PULSE in step S4 in FIG. 5. After calling the function, step S20 is first performed in which an energizing signal Vb with a signal value USG is applied to the motor 11 so that the motor 11 will accelerate. Subsequently there is a waiting time interval having the length of an acceleration time tacc during the execution of step S21. Subsequently the sign of the energizing signal Vb is reversed during the execution of step S22, so that the motor is slowed down again. Then there is a waiting time covering a delay interval tdec during the execution of waiting step S23. After this time interval has elapsed, the value of the energizing signal is set to zero in step S29 and there is a return to the program in which the program function was called. In the example of the program function described hereinbefore the energy contents of the energizing pulse are adapted by adapting the amplitude of the energizing pulse. It will be evident to those skilled in the art that the energy contents may also be adapted in another manner, for example by adapting one or both time intervals tacc and tdec.

Figure 4:
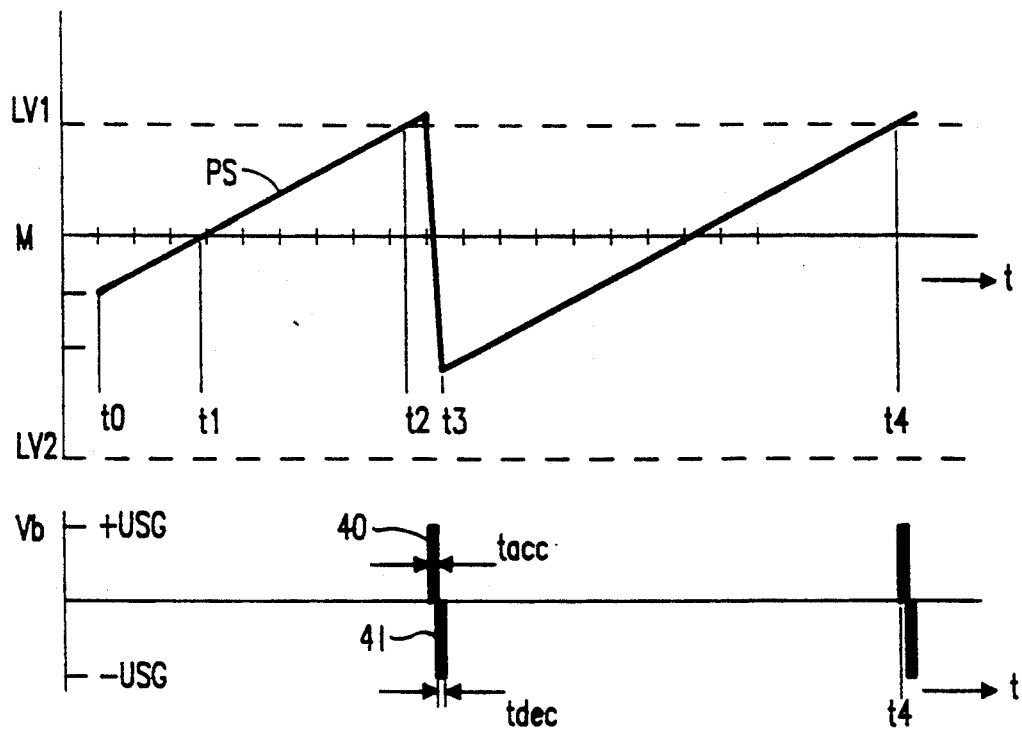
FIGS. 4 and 8 show the variation of the position-indication signal and FIGS. 5, 6 and 7 show flow charts of programs performed by a control unit of the scanning apparatus.
Figure 8:
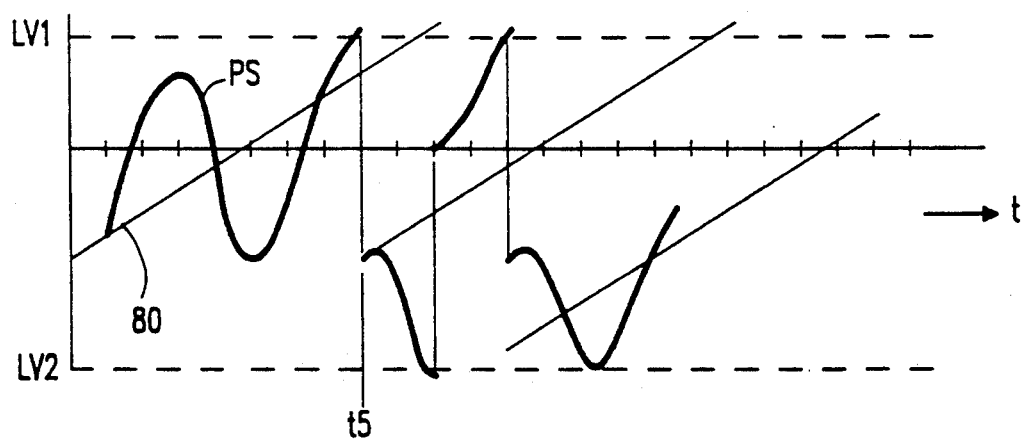

FIG. 4 shows the variation of the value of the position-indication signal between the energizing pulses as a monotonically increasing function of time t. It is to be noted that this will hardly occur in practice because the center of rotation 3 is generally located slightly eccentrically with respect to the centre of the spiral track. Consequently, the fine-positioning device will reciprocate around a monotonically varying average position during scanning. This results in a position-indication signal comprising a periodical component. A large periodical component may cause problems, as will be described with reference to FIG. 8 showing the time variation of a position-indication signal which has an unusually strong periodical component caused by the eccentricity. As a result of this periodical component the signal PS will intersect the threshold value LV1 already at an instant t5 before the average value (indicated by the broken line 80) of the position signal PS has reached the threshold value. As a result of this intersection an energizing pulse is supplied so that the slide and hence the fine-positioning device are displaced. Due to the eccentricity it may occur that a short time after the energizing pulse the fine-positioning device approaches the end of its range of displacement. Reaching the end of the range of displacement can be prevented by detecting an intersection of a threshold value of LV2 which corresponds to a position which is located proximate to the end of the range of displacement and by subsequently applying, in response to this detection, an energizing pulse to the motor 11 which displaces the slide in a direction opposite to the direction of the previous slide displacement.

Figure 6:
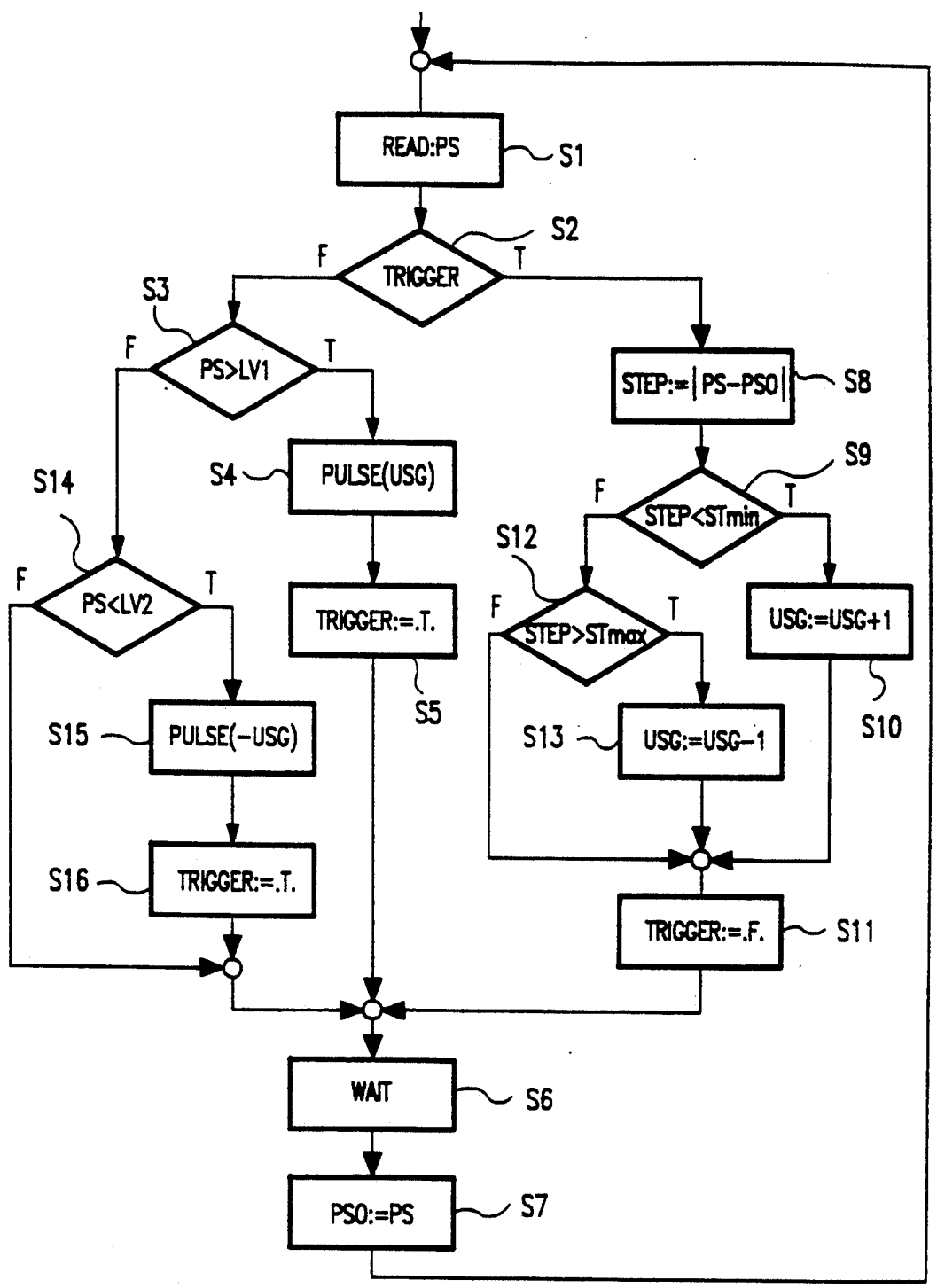

FIG. 6 shows a flow chart of an adapted program with which the fine-positioning device can be prevented, in the way as described hereinbefore, from reaching the end of its range of displacement. The program shows great similarity to the previously described program. It comprises three additional steps S14, S15 and S16. The step S14 is performed if it has appeared during the execution of step S3 that the value of the last position-indication signal PS which has been read is below the threshold value LV1.

In step S14 it is tested whether the last value which has been read is below the threshold value LV2. If negative, step S14 is followed by waiting step S6. If positive, the fine-positioning device tends to approach the end of its range of displacement. In that case the program function PULSE is called in step S15, in which step an energizing pulse is generated with a sign which is opposite to the sign of the last supplied energizing pulse. Subsequently the logic value .T. is assigned to the variable TRIGGER in step S16. After the execution of step S16 the program is continued again with the waiting step S6.

We claim:

1. Apparatus for scanning a disc-shaped record carrier having a track in the form of spiral turns around a center of rotation of the record carrier, said apparatus comprising:
   a scanning head for producing a scanning point on the record carrier and detection signals indicative of the position of the scanning point relative to said track;
   support means for supporting the scanning head and which is radially displaceable with respect to the record carrier;
   drive means for radially displacing the support means and thereby also radially displace the scanning point;
   a fine-positioning device on said support means for further radially displacing said scanning point within a predetermined limited range in accordance with variation of the position of said fine-positioning device relative to said support means;
   a tracking control circuit for receiving the detection signals from the scanning head and deriving therefrom a position-indication signal indicative of the position of said fine-positioning device relative to said support means; and
   control means coupled to the tracking control circuit to receive the position-indication signal, detecting when said signal exceeds a predetermined limit value, and in that event temporarily energizing said drive means so as to displace said support means towards a position at which said signal resumes a value below said limit value;
   the energizing of said drive means by said control means being in accordance with an energizing pattern which is independent of the instantaneous value of the position-information signal and which is determined by said control means by
      (i) detecting the effect on the position-information signal of energizing said drive means in accordance with a selected energizing pattern, and
      (ii) modifying the selected energizing pattern so that the modified pattern effects the position-information signal in accordance with a predetermined criterion.

2. Scanning apparatus as claimed in claim 1, wherein said control means determines the energizing pattern for energizing said drive means during a predetermined time interval following termination of a previous energization of said drive means.

3. Apparatus as claimed in either of claims 1 or 2, wherein said control means is adapted to detect from the position-information signal whether the displacement of said support means caused by energizing of said drive means falls within a predetermined range, and to modify the energizing pattern supplied to said drive means if said displacement extends beyond said predetermined range.

4. Scanning apparatus as claimed in either of claims 1 or 2, wherein after energizing said drive means in accordance with a first energization pattern said control means is adapted to detect whether the resulting position-information signal reaches an absolute value which exceeds a second predetermined limit value by an amount which is greater than first-named limit value, said second limit value being opposite in sign to said first-named limit value, and in that event to energize said drive means in accordance with a second energization pattern which displaces said support means in an opposite direction to the displacement thereof produced by said first energization pattern.

5. Scanning apparatus as claimed in claim 1, wherein said drive means is a self-braking motor.

* * * * *